United States Patent
Gorlin et al.

(10) Patent No.: US 11,251,472 B2
(45) Date of Patent: Feb. 15, 2022

(54) SYSTEM AND METHOD FOR OPERATING BATTERIES BASED ON ELECTRODE CRYSTAL STRUCTURE CHANGE

(71) Applicant: Robert Bosch GmbH, Stuttgart (DE)

(72) Inventors: Yelena Gorlin, Menlo Park, CA (US); John F. Christensen, Elk Grove, CA (US); Anantharaman Subbaraman, Mountain View, CA (US); Reinhardt Klein, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 16/441,352

(22) Filed: Jun. 14, 2019

(65) Prior Publication Data
US 2020/0006816 A1 Jan. 2, 2020

Related U.S. Application Data (60) Provisional application No. 62/690,376, filed on Jun. 27, 2018.

(51) Int. Cl.
| | |
|---|---|
| *H01M 10/44* | (2006.01) |
| *H01M 10/052* | (2010.01) |
| *H01M 10/42* | (2006.01) |
| H01M 10/0525 | (2010.01) |

(52) U.S. Cl.
CPC ...... *H01M 10/441* (2013.01); *H01M 10/0525* (2013.01)

(58) Field of Classification Search
CPC .......... H01M 10/441; H01M 10/0525; H01M 10/0582; H01M 10/44; H01M 2010/4271; H01M 10/42; H02J 7/00
See application file for complete search history.

(56) References Cited

U.S. PATENT DOCUMENTS

| | | | |
|---|---|---|---|
| 8,188,715 B2 | 5/2012 | Christensen et al. | |
| 10,581,050 B2* | 3/2020 | Craig | H01M 50/431 |
| 10,908,219 B2* | 2/2021 | Gorlin | G01R 31/367 |
| 2018/0358598 A1* | 12/2018 | Craig | H01M 50/411 |
| 2020/0127341 A1* | 4/2020 | Paz | H01M 10/425 |

OTHER PUBLICATIONS

N. Nitta; F. Wu; J. T. Lee; and G. Yushin, Li-ion Battery Materials: Present and Future, Materials Today, vol. 18, No. 5, pp. 252-264, 2015.

R. Nagai; F. Kita, M. Yamada; and H. Katayama, Development of Highly Reliable High-capacity Batteries for Mobile Devices and Small-to Medium-sized Batteries for Industrial Applications, Hitachi Review, vol. 60, No. 1, pp. 28-32, 2011.

(Continued)

*Primary Examiner* — Vuthe Siek
(74) *Attorney, Agent, or Firm* — Maginot, Moore & Beck LLP (57) ABSTRACT

A battery includes an electrode that exhibits a crystal structure change when lithiated beyond a threshold potential and a battery management system. The battery management system includes a controller configured to, while the battery is online, determine the threshold potential, determine battery operating parameters based on the determined threshold potential, and operate the battery based on the determined battery operating parameters.

20 Claims, 7 Drawing Sheets

(56) References Cited

OTHER PUBLICATIONS

M. N. Obrovac and V.L. Chevrier, Alloy Negative Electrodes for Li-Ion Batteries, Chemical Reviews. vol. 114. pp. 11444-11502 and correction p. 2014.

M. N. Obrovac; L. Christensen; D. B. Le; and J.R. Dahn; Alloy Design for Lithium-Ion Battery Anodes, Journal of The Electrochemical Society, vol. 154, No. 9, pp. A849-A855, 2007.

M. N. Obrovac and L. Christensen, Structural Changes in Silicon Anodes during Lithium Insertion/Extraction, Electrochemical and Solid-State Letters, vol. 7, No. 5, pp. A93-A96, 2004.

N. A. Chaturvedi; R. Klein; J. Christensen; J. Ahmed; and A. Kojic; Algorithms for Advanced Battery-Management Systems, IEEE Control Systems Magazine, vol. 30, No. 3, pp. 49-68, Jun. 2010.

\* cited by examiner

SYSTEM AND METHOD FOR OPERATING BATTERIES BASED ON ELECTRODE CRYSTAL STRUCTURE CHANGE

CLAIM OF PRIORITY

This application claims priority to U.S. Provisional Application Ser. No. 62/690,376 entitled "Method for Operating Batteries Based on Electrode Crystal Structure Change" filed Jun. 27, 2018, the disclosure of which is incorporated herein by reference in its entirety.

TECHNICAL FIELD

This disclosure relates generally to batteries, and more particularly to battery management systems for batteries.

BACKGROUND

A number of new battery chemistries are entering the market to provide capabilities required in specialized applications. At one time, the lithium-ion battery market was driven by the use of such batteries in portable electronics which require high energy but only limited life and power. More recently, other industries have focused on the use of batteries. By way of example, batteries are commonly incorporated into power tools and certain types of hybrid-electric vehicles. Each new industry requires different performance characteristics. Certain applications, such as automotive applications, require battery stability both in terms of battery safety for large packs and for long life, e.g. at least 10 to 15 years.

Lithium-ion batteries have become the industry standard in both electric mobility and portable electronics applications. Lithium-ion batteries operate based on the movement of lithium ions between the negative electrode, also known as the "anode," and the positive electrode, also known as the "cathode." Current negative electrodes are based on graphite, a material that intercalates lithium and has gravimetric capacity of 372 mAh/$g_{graphite}$. Silicon has been identified as a potential negative electrode material due to its ability to alloy with lithium and achieve gravimetric density of 3579 mAh/$g_{Si}$. However, at present, using pure silicon as a negative electrode has proven to be challenging because of the high volume expansion rates occurring during the lithiation process of pure silicon. Nonetheless, some current batteries incorporate of a small amount of pure silicon or materials containing silicon, such as silicon oxide (SiO) or silicon alloys ($SiB_3$, $Si_2Fe$, $TiSi_2$ and others), into graphite-based negative electrodes to increase the gravimetric capacity of the negative electrode above the level of pure graphite.

Lithium-ion batteries are often coupled to battery management systems (BMS) during the operation of the battery. The BMS generally includes a controller that executes program instructions stored in memory to operate the battery to control the speed at which the battery charges and discharges based on a known model of the operating parameters of the battery.

What is needed therefore is an improved way to design BMS strategies based on measurable features in order to improve cycle life of a lithium-ion battery and reduce drawbacks that may occur due to volume expansion during the lithiation process.

SUMMARY

A battery comprises an electrode that exhibits a crystal structure change when lithiated beyond a threshold potential, and a battery management system. The battery management system includes a controller configured to, while the battery is online, determine the threshold potential, determine battery operating parameters based on the determined threshold potential, and operate the battery based on the determined battery operating parameters.

In an embodiment of the battery, the determination of threshold potential includes identifying operating characteristics indicative of an internal state of the electrode.

In another embodiment, the determination of threshold potential includes: charging the battery to a first potential that is beyond than the threshold potential, discharging the battery from the first potential, and storing a first discharge curve in memory; and charging the battery to a second potential that is not beyond the threshold potential, discharging the battery from the second potential, and storing a second discharge curve in the memory.

In a further embodiment, the identification of the operating characteristics includes identifying at least one feature present in the first discharge curve that is absent in the second discharge curve.

In some embodiments of the battery, the determination of threshold potential further comprises performing charge and discharge cycles to a plurality of different cutoff potentials and determining the threshold potential based on corresponding discharge curves from the plurality of charge and discharge cycles.

The determining of the threshold potential based on the discharge curves from the plurality of charge and discharge cycles may, in some embodiments, include selecting as the threshold potential a lowest cutoff potential of the plurality of cutoff potentials at which the corresponding discharge curve does not include the at least one feature.

In one embodiment, the threshold potential is determined within 2 mV.

In some embodiments, the determination of the battery operating parameters includes selecting a state of charge curve based on the determined threshold potential and a charge cutoff potential from a most recent charge.

In yet another embodiment, the determination of the battery operating parameters includes adapting boundary conditions of a charging process based on the determined threshold potential.

In a further embodiment, the determination of the battery operating parameters includes selecting a charge target potential that is within 2 mV of the threshold potential.

In another embodiment, a method of operating a battery using a battery management system comprises, while the battery is online, determining a threshold potential, which, when lithiated beyond the threshold potential an electrode of the battery exhibits a crystal structure change. The method further includes determining battery operating parameters based on the determined threshold potential and operating the battery based on the determined battery operating parameters.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "comprising," "including," "having," and the like, as used with respect to embodiments of the disclosure, are synonymous. As used herein, the term "approximately" refers to values that are within ±10% of the reference value.

The embodiments of the disclosure discussed below are applicable to any desired battery chemistry. Some examples refer to lithium-ion batteries for illustrative purposes. As used herein, the term "lithium-ion battery" refers to any battery which includes lithium as an active material. In particular, lithium-ion batteries include, without limitation, lithium based liquid electrolytes, solid electrolytes, gel electrolytes, and batteries commonly referred to as lithium-polymer batteries or lithium-ion-polymer batteries. As used herein, the term "gel electrolyte" refers to a polymer infused with a liquid electrolyte.

Figure 1:
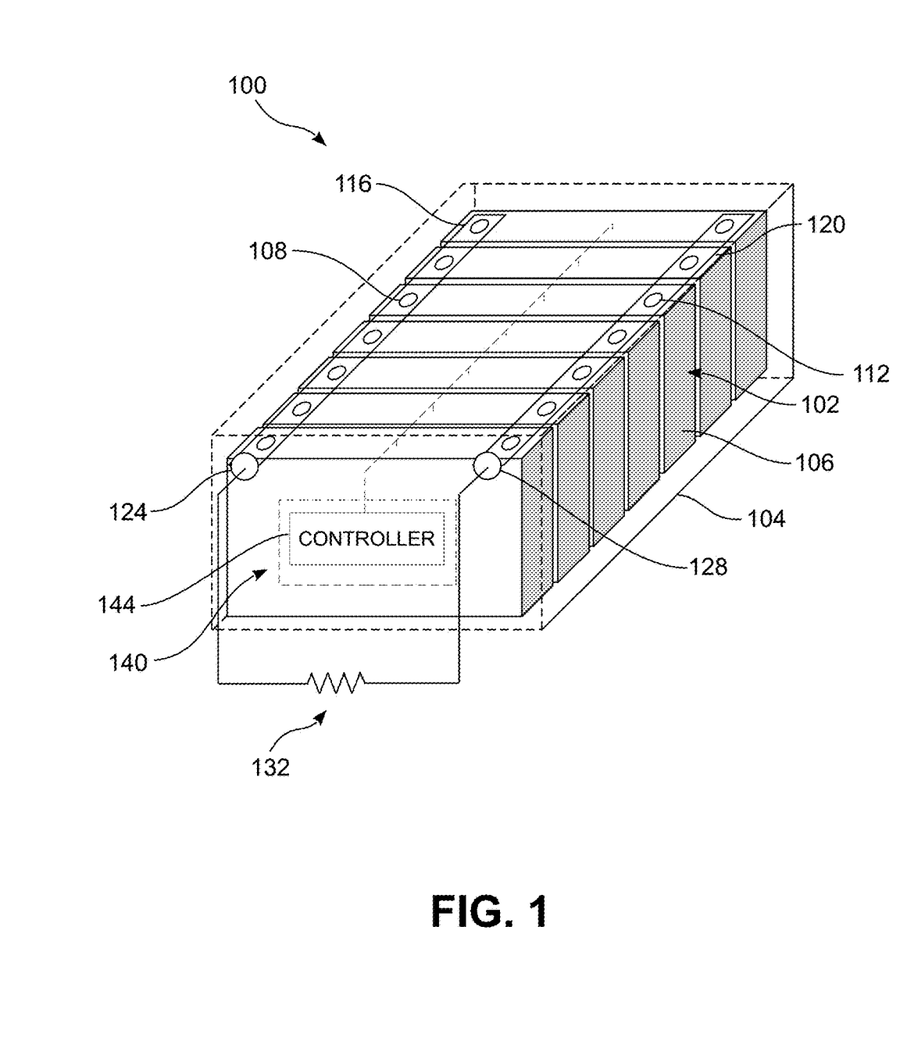
FIG. 1 is a schematic view of a battery pack according to the disclosure.

Referring now to FIG. 1, a battery pack 100 includes a plurality of battery cells 102 arranged in a pack housing 104. Each of the battery cells 102 includes a cell housing 106, from which a positive terminal 108 and a negative terminal 112 are exposed. In a parallel arrangement, the positive terminals 108 may be connected to one another by a current collector 116, and the negative terminals 112 may be connected to one another by a different current collector 120. In a series arrangement, the positive terminals 108 may be connected to adjacent negative terminals 112 by a current collector. The current collectors 116, 120 are connected to respective positive and negative battery pack terminals 124, 128, which connect to an external circuit 132 that may be powered by the battery pack 100, or may be configured to charge the battery pack 100.

In addition, the battery pack 100 includes a battery management system (BMS) 140 comprising a controller 144, a memory unit (not shown), and, in some embodiments, one or more sensors (not shown). Operation and control of the battery pack 100 is performed with the aid of the BMS 140. The controller 144 of the BMS 140 is implemented with general or specialized programmable processors that execute programmed instructions. The instructions and data required to perform the programmed functions are stored in the memory unit associated with the controller. The processors, the memory, and interface circuitry configure the controller 144 to operate the battery pack 100 to charge and discharge the battery within a desired charge and discharge rate, to a desired charge and discharge threshold, and otherwise operate the battery pack 100. The processors, the memory, and interface circuitry components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. The circuits described herein can also be implemented with a combination of processors, ASICs, discrete components, or VLSI circuits. Further discussion of the BMS and a BMS based on the electrochemical model can be found, for example, in U.S. Pat. No. 8,188,715, issued May 29, 2012, the contents of which are incorporated herein by reference in their entirety.

Figure 2:
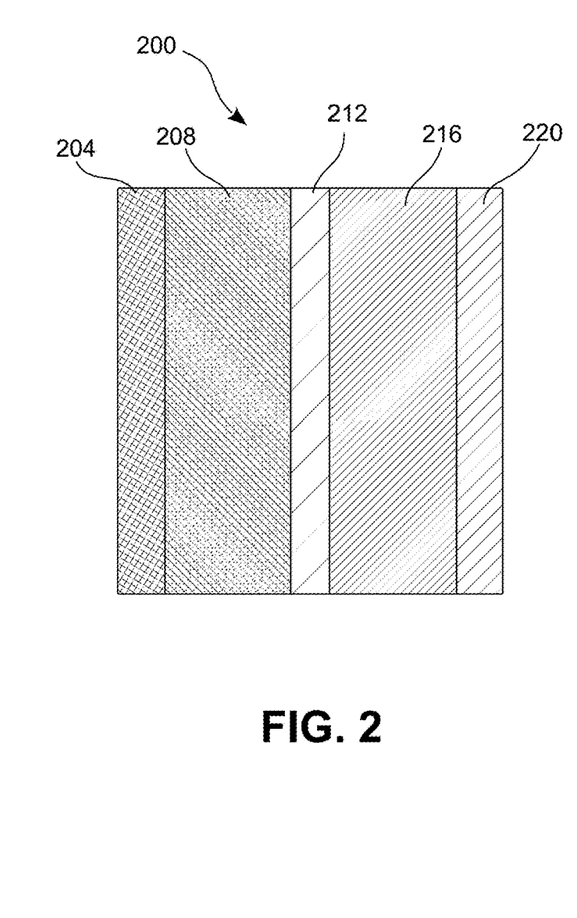
FIG. 2 is a schematic view of a battery cell of the battery pack of FIG. 1 having an electrode that exhibits crystal structure change.

Each battery cell 102 includes an electrode configuration 200, illustrated in FIG. 2, which includes a positive electrode current collector 204, a positive electrode layer 208, a separator layer 212, a negative electrode 216, and a negative electrode current collector 220. In some embodiments, multiple layers of the electrode configuration 200 are stacked on top of one another so as to form an electrode stack. In other embodiments, the electrode configuration 200 is wound around itself in a spiral shape so as to form what is known as a "jelly-roll" or "Swiss-roll" configuration.

The positive electrode current collector 204 connects the positive terminal 108 of the battery cell 102 with the positive electrode 208 so as to enable flow of electrons between the external circuit 132 and the positive electrode 208. Likewise, the negative electrode current collector 220 connects the negative terminals 112 with the negative electrode layer 216. In the illustrated embodiment, the negative electrode layer 216 includes a combination of graphite and one or more of silicon (Si), silicon oxide (SiO), and silicon alloys such as silicides. In another embodiment, the negative electrode layer 216 includes a different material that undergoes a crystal structure change during lithiation and delithiation.

When the battery pack 100 is connected to an external circuit 132 that is powered by the battery pack 100, lithium ions are separated from electrons in the negative electrode 216. The lithium ions travel through the separator 212 and into the positive electrode 208. The free electrons in the battery create a positive charge in the battery, and then flow from the negative electrode 216, through the negative electrode current collector 220, to the negative terminals 112 of the battery cells 102. The electrons are then collected by the battery pack current collector 120 and transported to the battery pack terminal 128. The electrons flow through the external circuit 132 so as to provide electrical power the external circuit 132, and then pass through the positive battery pack terminal 124, through the positive battery pack terminal 116, and back into the battery cells 102 via the positive terminals 108, where the electrons are collected by the positive electrode current collector 204 and distributed into the positive electrode 208. The electrons returning to the positive electrode 208 associate with the lithium ions that have crossed the separator 212. Connecting the battery pack 100 to an external circuit that charges the battery pack 100 results in the opposite flows of electrons and lithium ions.

When one of the electrodes contains a material, such as silicon or silicon-based materials, that undergoes a crystal structure change during lithiation or delithiation, the OCP/SOC or OCP-capacity relationship exhibits different electrochemical properties as compared to electrode materials that do not undergo a crystal structure change.

Figure 3:
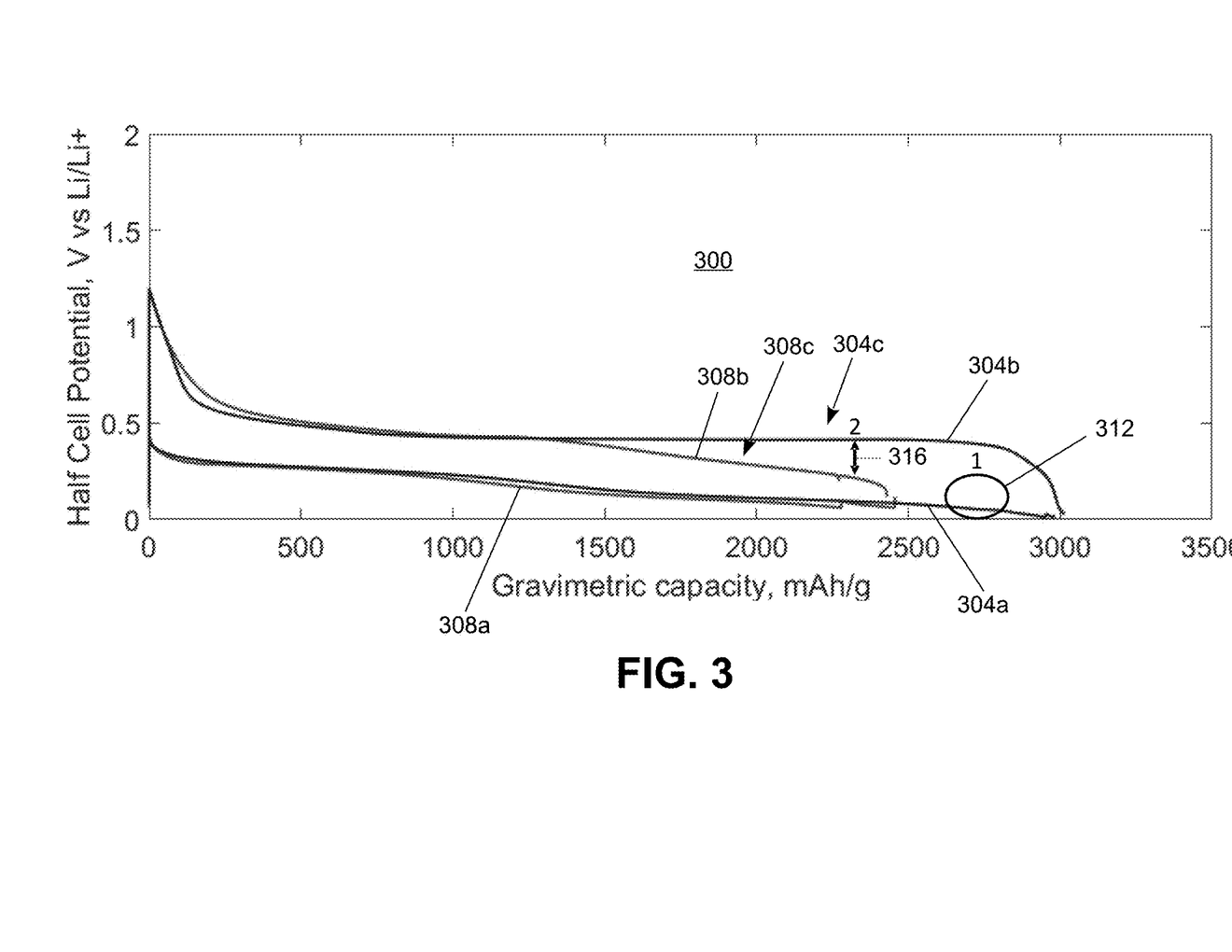
FIG. 3 is a graph of lithiation and delithiation vs capacity curves for a silicon electrode consisting of silicon and a conductive additive showing the difference in delithiation curves after lithiation either to 10 mV or 60 mV.

FIG. 3 depicts the lithiation and delithiation curves for a silicon electrode including silicon and a conductive additive. In the graph 300 of FIG. 3, the curve 304a represents lithiation of a silicon electrode to a cut-off potential of 0.010 V, while the curve 308a represents lithiation of a silicon electrode to a cut-off potential of 0.060 V.

As depicted in FIG. 3, when the silicon is lithiated to 10 mV (curve 304a), the delithiation curve 304b has a plateau region 304c at ~0.42 V. When silicon is lithiated to 60 mV or above (e.g. curve 308a), the delithiation curve 308b lacks the plateau region and instead has a continuous sloping feature 308c between 0.20 and 0.45 V. This observed change in the delithiation curves 304b, 308b is due to the change in the crystal structure of silicon, which occurs during lithiation at applied potentials below ~55 mV. The region where the crystal structure change occurs is designated as region 1 and marked by the circle 312, while the region where the difference between two delithiation curves is observed is designated in region 2 and marked by arrow 316.

Figure 4:
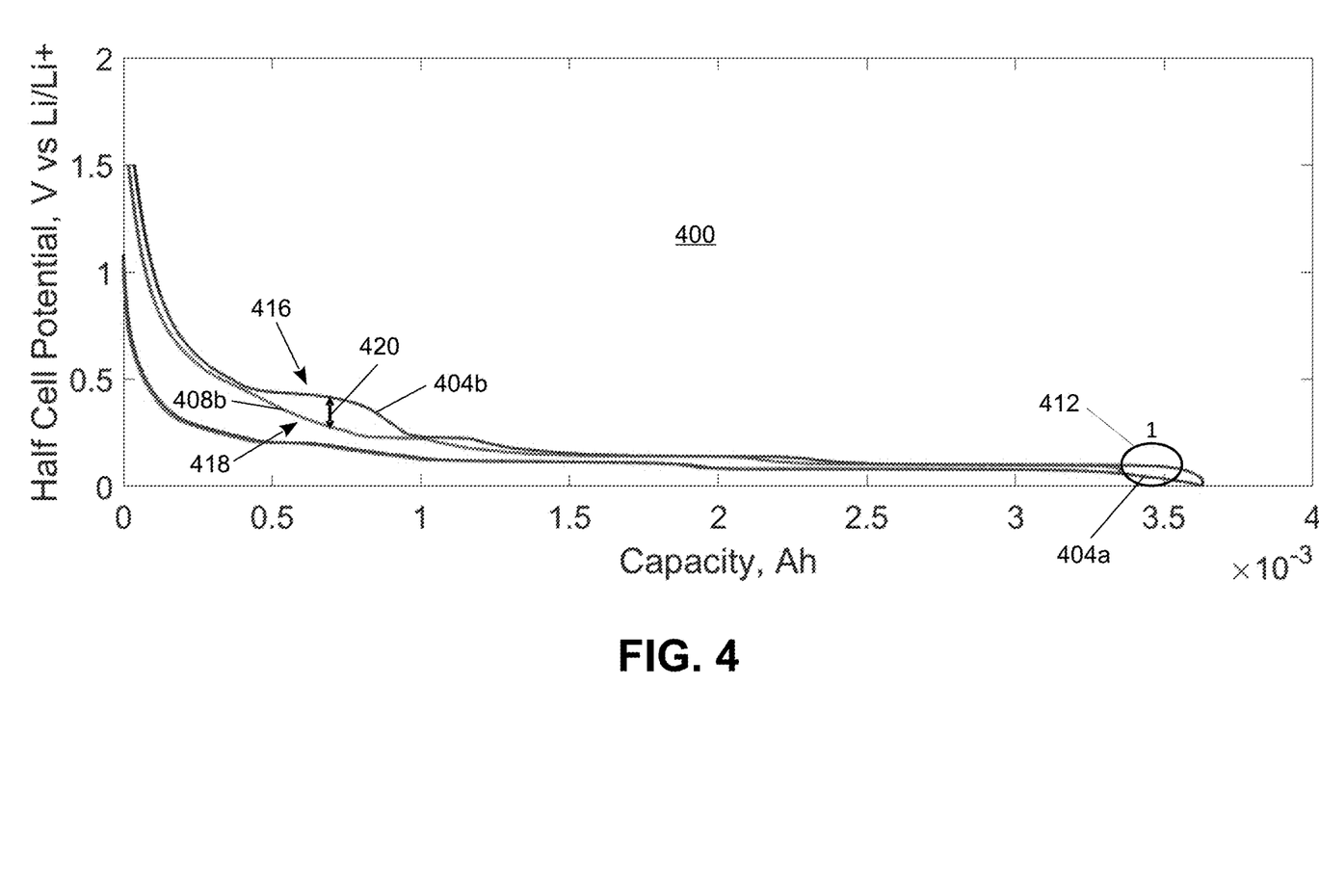
FIG. 4 is graph of lithiation and delithiation vs capacity curves for a half-cell test of a silicon-containing electrode showing the difference in delithiation curves after lithiation either to 10 mV or 60 mV.

In a similar manner, the difference in delithiation curves can also illustrate a difference between an electrode that has undergone a crystal structure change and an electrode that has not undergone a crystal structure change. FIG. 4 illustrates a "half-cell" test of delithiation curves of a negative electrode including of a mixture of graphite and SiO. The graph 400 of FIG. 4 illustrates lithiation and delithiation vs capacity curves using an electrode, which contains a mixture of SiO and graphite, extracted from a commercially available battery in 18650 format, and the extracted electrode is cycled against lithium metal.

In the graph 400 of FIG. 4, the curve 404a represents lithiation of the electrode to 1 mV, while the curve 404b represents delithiation of the negative electrode after the lithiation to 1 mV. The curve 408a represents lithiation of the electrode to 60 mV, while the curve 408b represents delithiation of the negative electrode after the lithiation to 60 mV. When silicon or silicon-based materials are lithiated below approximately 55 mV, as in curve 404a, the material undergoes a crystal structure change, marked by the circle 412. The crystal structure change of the material results in a delithiation curve 404b that differs from a silicon or silicon-based material that is lithiated to a higher cutoff voltage that lies at or above 55 mV, such as the 60 mV lithiation represented by curves 408a and 408b.

When the negative electrode is lithiated to 1 mV, the delithiation curve 404b has a plateau region 416 at approximately 0.44 V. In contrast, when the lithiation of the negative electrode ceases at 60 mV or above, the negative electrode's delithiation curve 408b lacks the plateau region, and instead has a continuous sloping feature 418 between 0.24 and 0.5 V. As such, there is a difference, represented by the arrow 420, between the delithiation curves 404b and 408b. The plateau region 412 and the difference 420 between the curves 404b, 408b at approximately 0.44 V is due to the change in the crystal structure of silicon and, as will be discussed in detail below, this difference in the delithiation curves can be used to partially validate the electrochemical model of batteries that contain silicon-based materials.

In conventional batteries, the potential at which the battery undergoes the crystal structure change is generally assumed to correspond to approximately 55 mV, based on previous literature and initial experimental data. As illustrated in FIG. 4, however, in a mixed silicon-graphite negative electrode, the two regions on the delithiation curve are separated from each other due to the presence of the graphite material. By varying the cut-off voltage from 70 to 50 mV, it is possible to determine the half-cell potential, also referred to as $\phi^*_a$, of the crystal structure change with greater accuracy than the conventional estimate of 55 mV. In some embodiments, the crystal structure change is determined to within 2 mV, while in other embodiments the crystal structure change is determined to within 1 mV.

Figure 5:
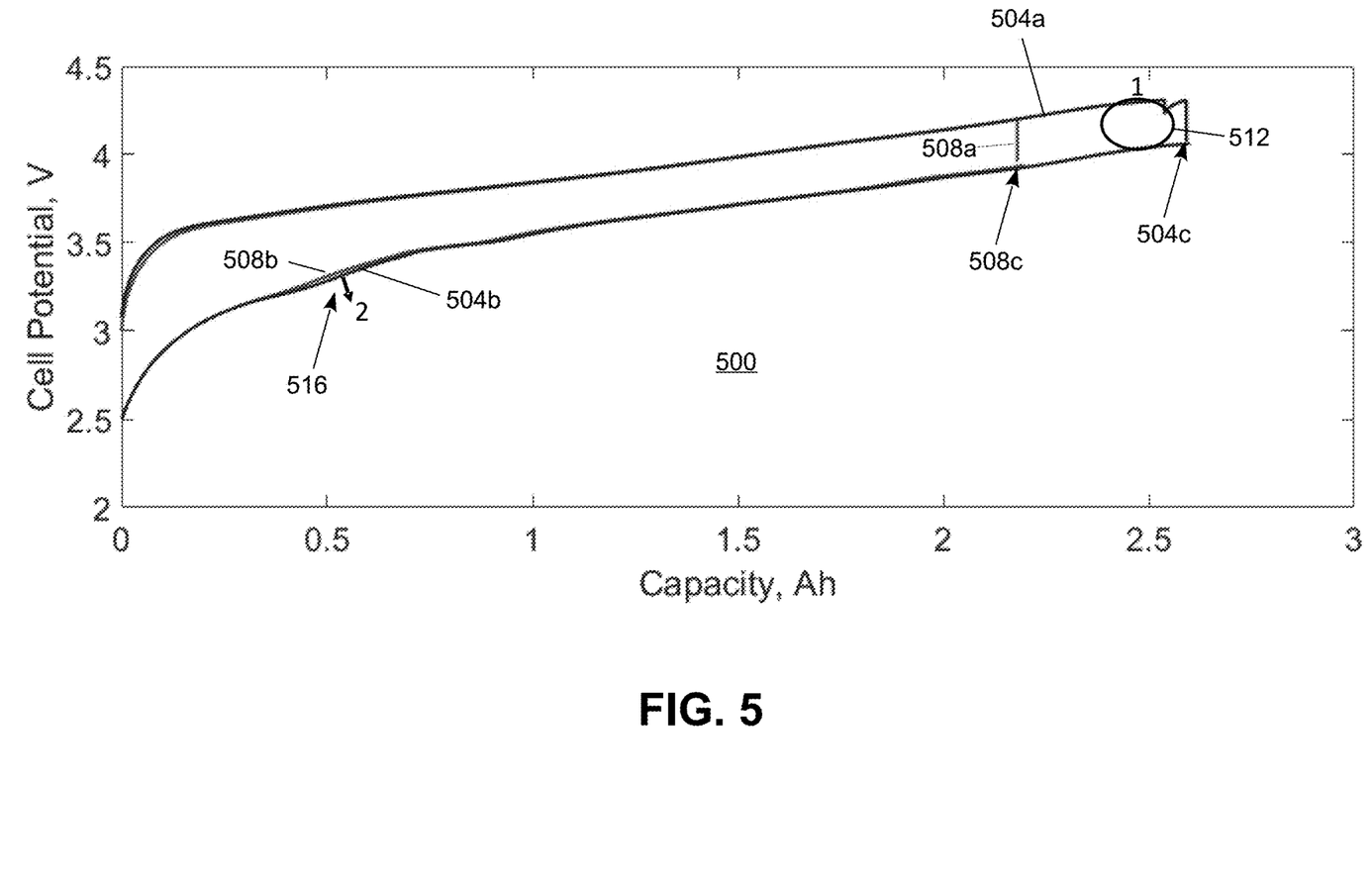
FIG. 5 is graph of the lithiation and the delithiation vs capacity curves in Ah for a full-cell test of a lithium-ion battery with a silicon-containing negative electrode, showing the difference between delithiation curves after lithiation above the crystal structure change potential and after lithiation to below the crystal structure change potential.

FIG. 5 illustrates a graph 500 of a "full-cell test" in which a commercial battery is charged at a constant current of 2C to two different potentials. One charging potential leads to a measurable feature upon delithiation of the battery, demonstrating that the charging potential was high enough for a crystal structure change to occur. The full cell test illustrated in FIG. 5 was performed on a commercially available 18650 battery in which the negative electrode includes graphite mixed with SiO.

The first curve 504a shows a first charging process in which the battery is charged to a potential of 4.35 V, which results in lithiation of the negative electrode to a level that is below approximately 55 mV. As seen in FIG. 5, the charging process of the first curve 504a results in a resting full cell potential 504c of 4.07 V.

The second curve 508a, on the other hand, shows a curve in which the battery was charged to a potential of 3.95 V, which corresponds to a cessation of the lithiation of the negative electrode at a potential of greater than 55 mV. The charging process depicted by the second curve 508a results in a resting full cell potential 508c of approximately 3.95 V.

Due to the additional charging of the battery in the first curve 504a, marked by the circle 512, during discharge of the cells at a rate of C/10, the discharge curve 504b of the first charging process exhibited difference from the discharge curve 508b of the battery charged by the second process represented by the curve 508a. This difference, visible at location 516 in the graph 500, can be attributed to differences in the delithiation after the electrode has undergone a crystal structure change. Thus, the charging conditions of the first curve 504a caused a crystal structure change in the silicon material, while the charging conditions of the second curve 508a did not result in a change in the crystal structure change in the silicon. The full cell potential at which the crystal structure change occurs can be correlated to the half-cell potential of the negative electrode using the experiments shown in FIGS. 4 and 5.

The parameterization and validation of electrochemical battery models is a challenging task. Parameterization often requires electrical testing that spans the operating regime of the battery and specialized electrochemical tests. Typically, the signals available for quantifying the performance of battery models are voltage and temperature. Due to the significantly large number of parameters required to simulate an electrochemical model, many parameters are fitted to match the model predictions to the available experimental data. Challenges in the optimization problem include presence of local minima, insufficient data quality for identifying certain model parameters and structural challenges in the model that make certain parameters difficult or impossible to uniquely identify. Consequently, different groups of parameters can result in similar voltage and temperature prediction from the model.

The accuracy of the fitted parameters and model quality can be determined by parameter specific electrochemical experiments. However, such experiments can be time-consuming and for some parameters the available methods may not be directly applicable or well refined. An alternative approach to further assess model quality is to measure internal states of the battery, for example the negative electrode and electrolyte potentials. Access to such measurements typically requires specialized cell design with multiple reference electrodes. In the case of a battery containing active materials that exhibit crystal structure change, however, it is possible to partially validate the internal state prediction of the model by detecting the features that are indicative of a crystal structure change, as described above with reference to FIGS. 3-5.

Figure 6:
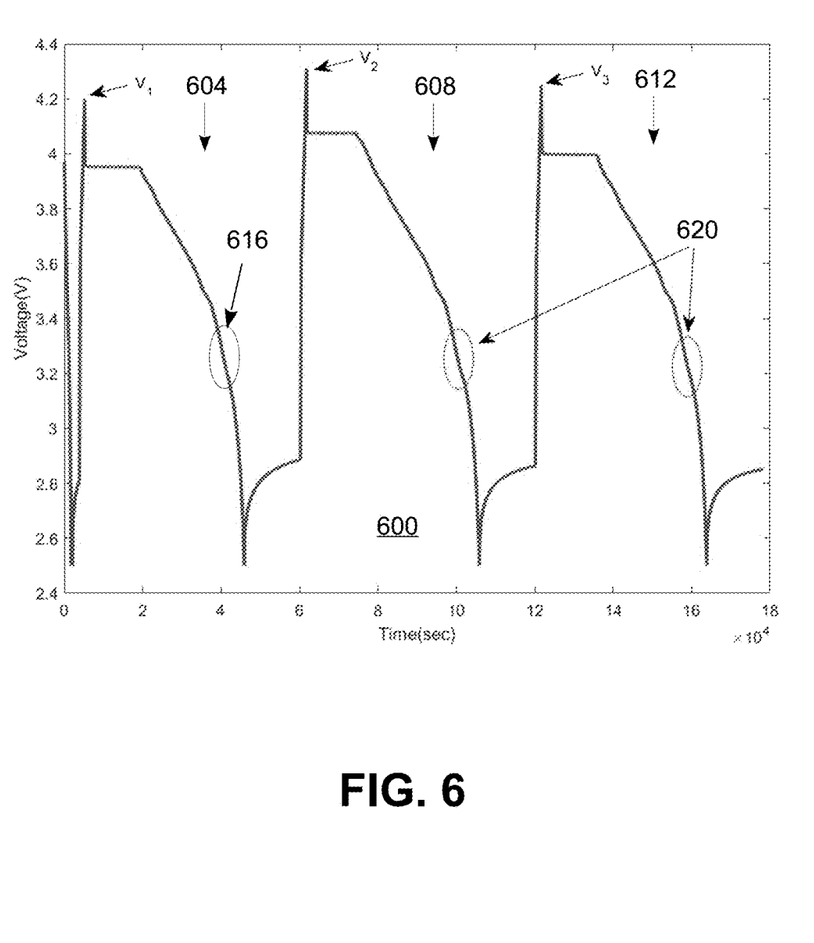
FIG. 6 depicts a series of three experiments by visualizing measured potential vs time to demonstrate how the potential at which crystal structure change occurs can be identified to within 2 mV accuracy.

FIG. 6 is a graph 600 depicting three exemplary charge-discharge cycles 604, 608, 612 in which the charging potential is varied with a goal of identifying the charging potential at which the crystal structure change first occurs within 2 mV. Starting from approximately 0% SOC on the first cycle, the cell is charged with constant current until a cut-off potential $v_1$ is reached, and then the cell is discharged at a slow rate (for example C/10) until the cell reaches a potential of 2.5V, to observe the presence or absence of the features associated with a crystal structure change. After the discharge is completed, the cut-off potential $v_1$ is either increased or decreased, and then the charge and discharge sequence is repeated.

In the first charge cycle 604, the battery was charged to a potential $V_1$ of 4.2V. The battery is then discharged and, as illustrated in FIG. 6, the corresponding discharge curve does not exhibit the feature (at 616) indicative of a crystal structure change (e.g. the difference 516 discussed above with reference to FIG. 5). In the second charge cycle 608, the battery was charged to a higher potential $V_2$, for instance 4.3V. The battery is again discharged, and this time the battery exhibits the difference in the discharge curve 620 that is indicative of the crystal structure change. In the third charge cycle 612, the battery was charged to a potential $V_3$ between $V_1$ and $V_2$, for example 4.25V, and then discharged. As seen in FIG. 6, discharge during the third charge cycle 612 also exhibited the feature 620 indicative of the crystal structure change. As such, the electrode undergoes the crystal structure change between 4.20V and 4.25V.

The procedure illustrated in FIG. 6 may be repeated for a desired number of cycles to achieve the desired accuracy. The potential $V^*$ ($V_1$ in the illustrated experiment) at which the cut-off potential $V_i<V^*$ depicts the crystal change feature not being detected in the subsequent discharge cycle, while for $V_i>V^*$ the crystal change feature is detected. From the resulting potential, $V^*$, the relevant internal state (negative electrode potential, $V_{neg}$) is extracted and compared to the known value of the half-cell potential $\Phi^*_a$ as determined above with reference to FIGS. 3-5.

Figure 7:
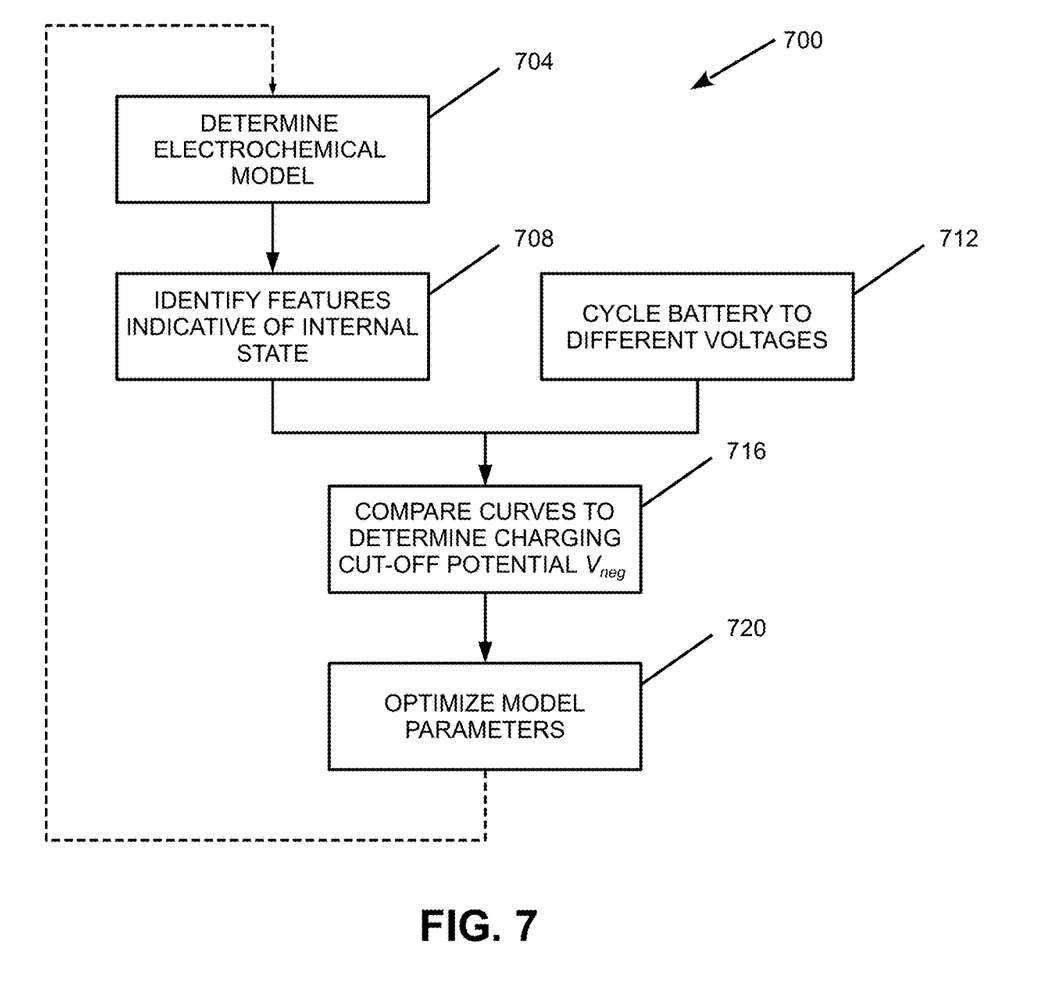
FIG. 7 depicts a flow diagram of a model optimization process which uses the potential of crystal structure change to identify model parameters for the BMS.

FIG. 7 depicts a flow chart 700 of a model optimization procedure according to the disclosure that uses the potential of crystal structure change to identify a better fit to model parameters. The intrinsic thermodynamic relationships between the $OCP_O$ and $SOC_O$ for each electrode are dependent upon material properties which do not typically change. However, as illustrated above with reference to FIGS. 3 and 4, materials in which the crystal structure changes have different thermodynamic relationships that can change during cell use.

Due to the relationship between OCP and SOC or capacity for the materials that exhibit a crystal structure change, detection of crystal structure change can be used to partially validate an internal state of the battery cell. The validation procedure includes the initial determination of the potential $\Phi^*_a$ at which the silicon undergoes a crystal structure change based on the electrochemical battery model (block 704), using a similar method as discussed above with regard to FIGS. 4 and 5. In particular, the battery is charged to a cell potential that is known to cause a crystal structure change and to a cell potential that is known not to cause a crystal structure change. Differences in the delithiation curves (for example curves 504b and 508b) between the two charging processes, for example the difference 516 illustrated in FIG. 5, are used to determine predictable features that are observable in the discharge curve of the battery after a crystal structure change has occurred as compared to discharge after a crystal structure change has not occurred. When using electrochemical model, the BMS operates based on both full-cell potential and internal states such as $V_{neg}$. Alternatively, in other embodiments, the BMS may operate under the electrochemical model based on only the full-cell potential or only the internal state.

Thus, based on the electrochemical battery model determined in block 704, features based on the internal state of the battery can be predicted (block 708). For example, the BMS may be configured to determine that a feature indicative of the crystal structure change of the battery electrode exists when the potential varies at a particular point on the curve by approximately 5 mV from the curve for which no crystal structure change has occurred. In another embodiment, the BMS determines the feature where the potential varies at a particular point on the curve by approximately 10 mV from the curve for which no crystal structure change has occurred. In various embodiments, the threshold potential difference may be any value between approximately 5 mV and approximately 10 mV, depending on the capacity ratio between the graphite and Si or SiO. In other embodiments, the BMS may be programmed with another desired threshold potential difference indicative of the crystal structure change feature based on the particular chemistry of the electrode and the battery.

In a further embodiment, the BMS identifies the features indicative of the crystal structure change by, for example, identifying a rapid change in the potential-based estimated SOC of silicon oxide. In one particular embodiment, the threshold for such a SOC-based feature identification would be approximately or exactly a 5% deviation from the capacity-based SOC change.

Additionally, the battery cell may be cycled to various charging cut-off potentials in a similar manner as described above with reference to FIG. 6 (block 712). The curves are compared with one another to determine the charging cut-off potential $V^*$, which is the highest potential at which no crystal change occurs and the negative electrode potential $V_{neg}$, which is the lowest potential at which the crystal structure change is detected (block 716). The determined charging cut-off potential may be compared to the potential $\Phi^*_a$ expected from the electrochemical model to validate the predicted internal states. Based on the differences between the lithiation potential $\Phi^*_a$ determined from the electrochemical battery model (block 704) and the identified $V_{neg}$ from the V, I, and T data (block 712), the model parameters may be updated to better predict the internal states of the battery cell based on different charging processes (block 720), and the updated parameters may be used for a subsequent iteration of the method 700.

In one embodiment, the detection of crystal structure change may be incorporated directly in the formulation of the optimization problem to fit the model parameters. Typically the optimization problem is posed as follows:

$$p^* = \arg\min_{p \in P} \sum_{i=1}^{N} J_i(y_{model,i}, y_{exp,i})$$

$$\text{s.t } \dot{x}_i(t) = f(x_i(t), z_i(t), u(t), p)$$

$$0 = g(x_i(t), z_i(t), u(t), p)$$

$$y_{model,i}(t) = h(x_i(t), z_i(t), u(t), p)$$

$$x_i(0) = X_i(y_{exp,i}(0), p)$$

where J is the cost function, x and z refer to the differential and algebraic states of the model, f, g, h refer to the functions that form the electrochemical model structure, i refers to the experiment number, $X_i$ refer to the initial condition of the $i^{th}$ experiment, p* is the result of the optimization problem and the set P defines the upper and lower limits for the parameter variation. The functions f, g, h are derived using model order reduction techniques from the physics based Li-ion battery model, which includes coupled partial differential equations.

For simplicity, the experiment subscript i is ignored in the following section. The model outputs are $y_{model}=[V_{model}, T_{model}]$ and the experiment measurements are $y_{exp}=[V_{exp}, T_{exp}]$. The structure of the cost function is typically $J=w_1|V_{model}-V_{exp}|_2+w_2|T_{model}-T_{exp}|_2$. However, by using the experiments that identify at which potential the crystal structure change occurs, the cost function can be modified to include more information on the internal states of the system. For example, in one such modification, $J=w_1|V_{model}-V_{exp}|_2+w_2|T_{model}-T_{exp}|_2+w_3|\mu(x,z)-\alpha_{exp}|$, where $\alpha_{exp}=1$ if, for the given cycle, a structure change is detected, and $\alpha_{exp}=0$ if the structure change is not detected. The function $\mu$ is an indicator function for the crystal structure change that maps to 0 or 1 and depends on the model states, while $w_i$ are weights. An example structure for the function $\mu$ would be $\mu(x,z)=1$, if $|z_k|<\Phi^*_a$ at some time during charge, where $z_k$ refers to a state in the vector z, and is 0 otherwise. Thus, the BMS is configured to select or incorporate the appropriate model based on the detection of the crystal structure change.

In some embodiments, the BMS operating parameters are updated while the battery is in service, otherwise referred to as being online, based on the detected crystal structure change. In particular, in various embodiments, the crystal structure change is detected to improve the voltage prediction and accuracy of the SOC estimation, to improve the voltage prediction and power prediction accuracy, to adapt the battery limits over the life of the battery and control the battery aging behavior, and/or to optimize fast-charging algorithms for Li-ion batteries.

Figure 8:
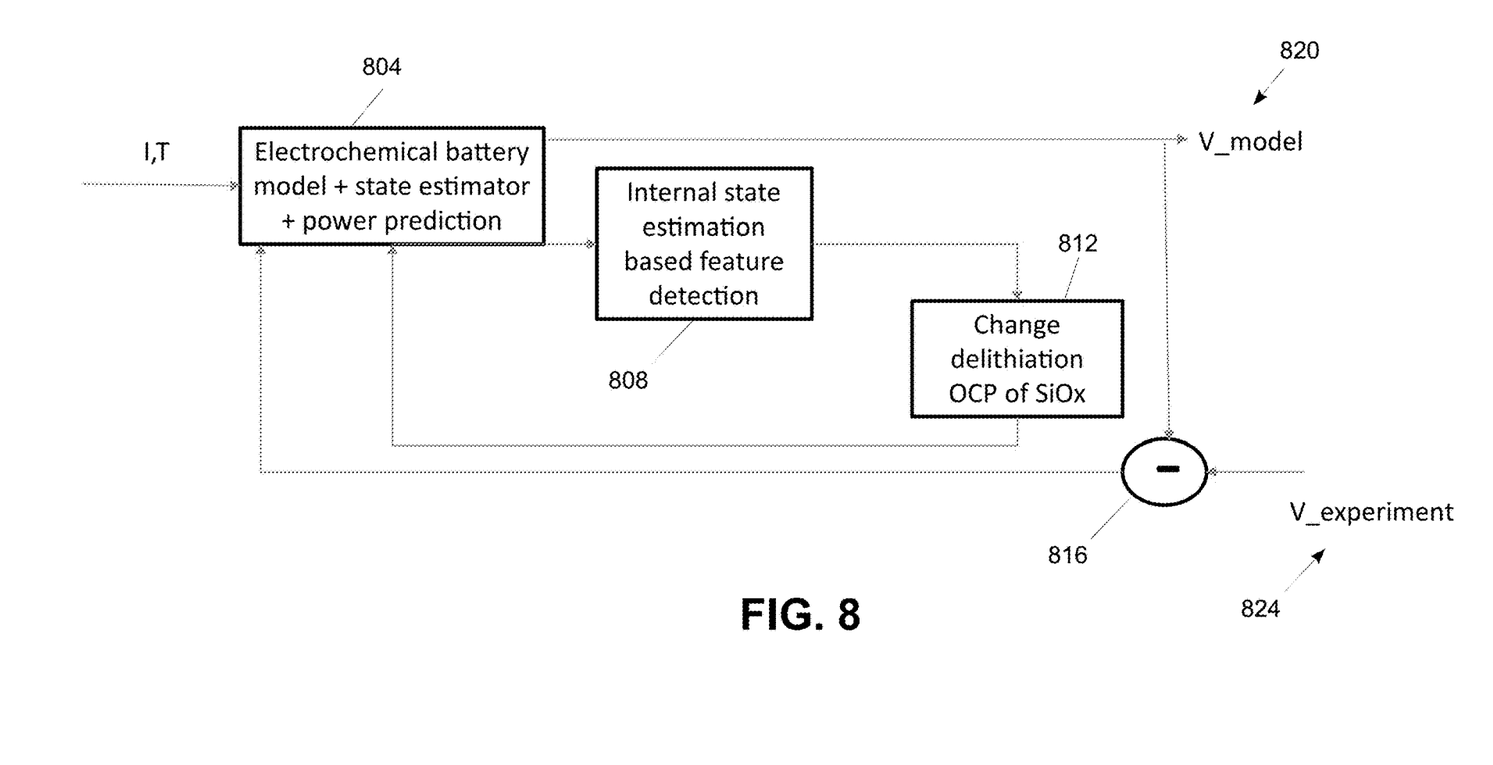
FIG. 8 depicts a flow chart of a process of using the detection of crystal structure change to improve model voltage prediction and SOC estimation accuracy in a BMS.

FIG. 8 depicts a flow chart example of a process 800 of improving model voltage prediction and SOC estimation accuracy based on the detection of crystal structure change. During the operation of the battery, the electrochemical battery model is used to estimate the state of charge of the battery by, for example, the process described above with reference to FIG. 5 and block 704 (block 804). When using electrochemical model, the BMS may operate based on both full-cell potential and internal states, such as $V_{neg}$, which is equivalent to the half-cell potential of the anode. In other embodiments, the BMS may operate based on either the full-cell potential or the internal states of the battery. From the experimental data, certain features of the discharge curves are determined that correlate with whether a crystal structure change has occurred during the charging process for a battery with a negative electrode that contains Si, SiO, Si alloys or other materials that can undergo a crystal structure change (block 808).

The changes in the features observed can be attributed to a change in the OCP of the battery cell during delithiation of the negative electrode. Consequently, the internal states that correlate to the structure change are used to determine which delithiation boundary curve of the negative electrode is used the model for the subsequent model predictions (block 812). In particular, when an electrode of the battery has undergone a crystal structure change, the state of charge curve and power prediction are determined from the curve based on the determined crystal structure change while, when the electrode has not undergone the crystal structure change, the state of charge and power prediction are based on the curve for no crystal structure change.

Advantageously, the disclosed BMS can therefore provide more accurate voltage and state of charge predictions for the model than in conventional BMS systems. Since the algorithm for power prediction in a BMS relies on a model for accurate voltage prediction, improving the quality of the voltage prediction model by detecting and accounting for crystal structure change results in improved power prediction capabilities for the BMS.

Moreover, since algorithms for accurate SOC estimation rely on voltage error feedback (block 816) between model predicted voltage 820 and measured cell voltage 824, improving the model quality while the battery is online by detecting structure changes in the negative electrode results in more accurate estimation of the battery SOC.

The BMS is configured to charge the battery with a charging current that controls the internal states of the battery, for example $V_{neg}$, to maintain the current and the current integral (i.e. capacity) within a specified range, thereby also maintaining the potential in a desired range. Since the disclosed BMS operation provides a more accurate SOC determination, the charging current is more accurately controlled to maintain the potential in the desired range.

In another embodiment, the BMS is configured to optimize the operating regime of the battery in order to reduce battery aging over the lifetime of the battery. The battery is operated by the BMS to gradually decrease the maximum charging cut-off potential or the applied constant voltage over the life of the battery. For batteries that exhibit crystal structure change, the detection of crystal structure change can be used to adapt the boundary conditions of the operating regime. In one particular embodiment, the detection of the crystal structure change is correlated to the battery operation at potentials close to, but just outside, the lithium plating regime of the battery, which occurs at $V_{neg}<0$. Since lithium plating behavior is a well-known aging mechanism and a potential safety issue, by detecting the crystal structure change, the maximum operating voltage of the battery can be adapted with battery age to maintain $V_{neg}>0$ to reduce deterioration of the battery due to lithium plating.

Detecting crystal structure change also helps adaptation of empirical fast charging algorithms in the absence of an electrochemical model. The adaptation is made on a cycle by cycle basis after the detection of the crystal structure change on the discharge. In the next charge cycle, this information is used by the BMS to adapt the parameters of the fast charging algorithm leading to an iterative learning control process. In particular, the knowledge of crystal structure change in the discharge process can be used to adapt the maximum voltage of the battery or cutoff criterion during fast charging to achieve fast charging, while minimizing aging of the battery.

For example, based on the derived and validated relationship between OCP and SOC, the lithiation of the battery may be limited to a potential value that is immediately adjacent to, but not beyond, the determined threshold potential at which the electrode undergoes a crystal structure change. In particular, in one embodiment, the battery is lithiated to a full-cell potential that is immediately above or immediately below (e.g. within 2 mV) the threshold potential at which it is been determined that the silicon or silicon-based material undergoes the crystal structure change. In different embodiments, the lithiation during battery operation may be limited to a charge target half-cell potential that is less than or greater than the crystal structure change threshold potential by, for example, approximately 1 mV, approximately 2 mV, approximately 5 mV, or approximately 10 mV. Advantageously, in such operation, the individual battery or the type of battery can be tested both with a detailed electrochemical model and a simpler model, and the battery operating parameters can be optimized more precisely than a BMS in which the crystal structure change is assumed to avoid the crystal structure change or, if desired, to ensure that the crystal structure change occurs.

In another embodiment, the BMS strategy includes controlling the negative electrode potential to a charge target potential in the region between 70 mV and 55 mV, using the validated internal state. In such an embodiment, the BMS strategy is used in a combination with a detailed electrochemical model.

In a further embodiment, the BMS strategy includes controlling the negative electrode potential to a charge target potential in the region below 55 mV. Controlling the negative electrode potential in the region below 55 mV can enable access to additional capacity for the battery that would not otherwise be available if the battery is operated to the conventional 55 mV potential level, which is only an estimate of the potential at which the crystal structure change occurs and not an accurate determination thereof.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A battery comprising:
   an electrode that exhibits a crystal structure change when lithiated beyond a threshold potential;
   a battery management system comprising a controller configured to, while the battery is online:
   determine the threshold potential;
   determine battery operating parameters based on the determined threshold potential; and
   operate the battery based on the determined battery operating parameters.

2. The battery of claim 1, wherein the determination of threshold potential includes identifying operating characteristics indicative of an internal state of the electrode.

3. The battery of claim 2, wherein the determination of threshold potential includes:
   charging the battery to a first potential that is beyond than the threshold potential, discharging the battery from the first potential, and storing a first discharge curve in memory; and
   charging the battery to a second potential that is not beyond the threshold potential, discharging the battery from the second potential, and storing a second discharge curve in the memory.

4. The battery of claim 3, wherein the identification of the operating characteristics includes identifying at least one feature present in the first discharge curve that is absent in the second discharge curve.

5. The battery of claim 4, wherein the determination of threshold potential further comprises:
   performing charge and discharge cycles to a plurality of different cutoff potentials; and
   determining the threshold potential based on corresponding discharge curves from the plurality of charge and discharge cycles.

6. The battery of claim 5, wherein the determining of the threshold potential based on the discharge curves from the plurality of charge and discharge cycles includes selecting as the threshold potential a lowest cutoff potential of the plurality of cutoff potentials at which the corresponding discharge curve does not include the at least one feature.

7. The battery of claim 6, wherein the threshold potential is determined within 2 mV.

8. The battery of claim 1, wherein the determination of the battery operating parameters includes selecting a state of charge curve based on the determined threshold potential and a charge cutoff potential from a most recent charge.

9. The battery of claim 1, wherein the determination of the battery operating parameters includes adapting boundary conditions of a charging process based on the determined threshold potential.

10. The battery of claim 9, wherein the determination of the battery operating parameters includes selecting a charge target potential that is within 2 mV of the threshold potential.

11. A method of operating a battery using a battery management system, the method comprising:
    while the battery is online:
    determining a threshold potential beyond which lithiation of an electrode of the battery results in the electrode exhibiting a crystal structure change;
    determining battery operating parameters based on the determined threshold potential; and
    operating the battery based on the determined battery operating parameters.

12. The method of claim 11, wherein the determination of threshold potential includes identifying operating characteristics indicative of an internal state of the electrode.

13. The method of claim 12, wherein the determination of threshold potential includes:
    charging the battery to a first potential that is beyond than the threshold potential, discharging the battery from the first potential, and storing a first discharge curve in memory; and
    charging the battery to a second potential that is not beyond the threshold potential, discharging the battery from the second potential, and storing a second discharge curve in the memory.

14. The method of claim 13, wherein the identification of the operating characteristics includes identifying at least one feature present in the first discharge curve that is absent in the second discharge curve.

15. The method of claim 14, wherein the determination of threshold potential further comprises:
performing charge and discharge cycles to a plurality of different cutoff potentials; and
determining the threshold potential based on corresponding discharge curves from the plurality of charge and discharge cycles.

16. The method of claim 15, wherein the determining of the threshold potential based on the discharge curves from the plurality of charge and discharge cycles includes selecting as the threshold potential a lowest cutoff potential of the plurality of cutoff potentials at which the corresponding discharge curve does not include the at least one feature.

17. The method of claim 16, wherein the threshold potential is determined within 2 mV.

18. The method of claim 11, wherein the determination of the battery operating parameters includes selecting a state of charge curve based on the determined threshold potential and a charge cutoff potential from a most recent charge.

19. The method of claim 11, wherein the determination of the battery operating parameters includes adapting boundary conditions of a charging process based on the determined threshold potential.

20. The method of claim 19, wherein the determination of the battery operating parameters includes selecting a charge target potential that is within 2 mV of the threshold potential.

* * * * *